(12) United States Patent
Matsuo

(10) Patent No.: US 7,631,192 B1
(45) Date of Patent: Dec. 8, 2009

(54) NETWORK APPARATUS FOR ACCESSING SERVICES OVER A NETWORK

(75) Inventor: Masahiro Matsuo, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 2169 days.

(21) Appl. No.: 09/699,402

(22) Filed: Oct. 31, 2000

(30) Foreign Application Priority Data

Nov. 2, 1999 (JP) .............................. P. 11-311861

(51) Int. Cl.
G06F 21/00 (2006.01)
H04L 29/06 (2006.01)
H04L 9/32 (2006.01)
G06F 7/04 (2006.01)
H04K 1/00 (2006.01)

(52) U.S. Cl. .................. 713/182; 713/165; 713/168; 726/4; 726/7; 726/17; 380/247

(58) Field of Classification Search ................. 713/182, 713/185, 200, 201; 705/51, 67; 709/203, 709/217
See application file for complete search history.

(56) References Cited

U.S. PATENT DOCUMENTS

| 5,265,239 | A | * | 11/1993 | Ardolino ..................... 709/217 |
| 5,343,530 | A | * | 8/1994 | Viricel .......................... 705/67 |
| 5,473,687 | A | * | 12/1995 | Lipscomb et al. ............. 705/51 |
| 5,564,016 | A | * | 10/1996 | Korenshtein ................. 713/200 |
| 5,771,291 | A | * | 6/1998 | Newton et al. ............... 713/185 |
| 5,822,518 | A | * | 10/1998 | Ooki et al. ................... 713/201 |
| 5,867,821 | A | * | 2/1999 | Ballantyne et al. ............. 705/2 |
| 5,900,867 | A | * | 5/1999 | Schindler et al. ............ 715/719 |
| 5,925,106 | A | * | 7/1999 | Nielsen ....................... 709/247 |
| 5,930,808 | A | * | 7/1999 | Yamanaka et al. ........... 715/205 |
| 5,946,697 | A | * | 8/1999 | Shen ........................... 715/513 |

(Continued)

FOREIGN PATENT DOCUMENTS

JP 7-193866 7/1995

(Continued)

OTHER PUBLICATIONS

Angin et al, The Mobiware Toolkit: Programmable Support for Adaptive Mobile Networking, 1998, IEEE, pp. 32-43.*

(Continued)

*Primary Examiner*—Ayaz R Sheikh
*Assistant Examiner*—Aravind K Moorthy
(74) *Attorney, Agent, or Firm*—Crowell & Moring LLP

(57) ABSTRACT

A remote controller device 2 sends its own ID code when specifying an access destination to a main device 1. Upon receipt of an access command from the remote controller device 2, the main device 1 appends the ID code of the remote controller device 2 to information obtained by accessing the access destination and outputs the same. The remote controller device 2 takes in the output only when it is appended with its own ID code and displays the same on a display unit 25. Thus, the user can confirm the information the main device 1 has obtained from the network 7 on the display unit 25 of the remote controller device 2. Consequently, the risk that the information is seen by anyone around can be reduced, thereby making it possible to improve the security on the private information.

19 Claims, 7 Drawing Sheets

U.S. PATENT DOCUMENTS

| | | | |
|---|---|---|---|
| 5,949,351 A * | 9/1999 | Hahm | 340/825.72 |
| 5,987,499 A * | 11/1999 | Morris et al. | 709/203 |
| 5,999,968 A * | 12/1999 | Tsuda | 709/213 |
| 6,119,228 A * | 9/2000 | Angelo et al. | 713/180 |
| 6,130,726 A * | 10/2000 | Darbee et al. | 348/734 |
| RE36,988 E * | 12/2000 | Johnson et al. | 725/25 |
| 6,266,664 B1 * | 7/2001 | Russell-Falla et al. | 707/5 |
| 6,304,907 B1 * | 10/2001 | Keronen et al. | 709/229 |
| 6,305,603 B1 * | 10/2001 | Grunbok et al. | 235/379 |
| 6,334,188 B1 * | 12/2001 | Maria | 713/182 |
| 6,509,908 B1 * | 1/2003 | Croy et al. | 345/716 |
| 6,661,784 B1 * | 12/2003 | Nykanen | 370/338 |
| 6,671,356 B2 * | 12/2003 | Lewis | 379/88.13 |
| 6,765,557 B1 * | 7/2004 | Segal et al. | 345/173 |
| 6,772,394 B1 * | 8/2004 | Kamada | 715/513 |
| 6,882,299 B1 * | 4/2005 | Allport | 341/176 |
| 7,016,675 B1 * | 3/2006 | Schuster et al. | 455/433 |
| 7,334,735 B1 * | 2/2008 | Antebi et al. | 235/492 |
| 7,516,467 B1 * | 4/2009 | Arai et al. | 725/39 |

FOREIGN PATENT DOCUMENTS

| | | |
|---|---|---|
| JP | 8-125724 | 5/1996 |
| JP | 10-322780 A | 12/1998 |
| JP | 11-196345 A | 7/1999 |
| JP | 11-288402 A | 10/1999 |
| JP | 11-298519 A | 10/1999 |

OTHER PUBLICATIONS

Gibbs, Mark, Clipping the Web so it fits in the palm of your hand, Sep. 1999, Network World, p. 68.*

Chuang et al, Dynamic Service Composition for Wireless Web Access, Aug. 2002, IEEE, pp. 429-436.*

Japanese Office Action dated Feb. 25, 2004 with English translation (Three (3) Pages).

* cited by examiner

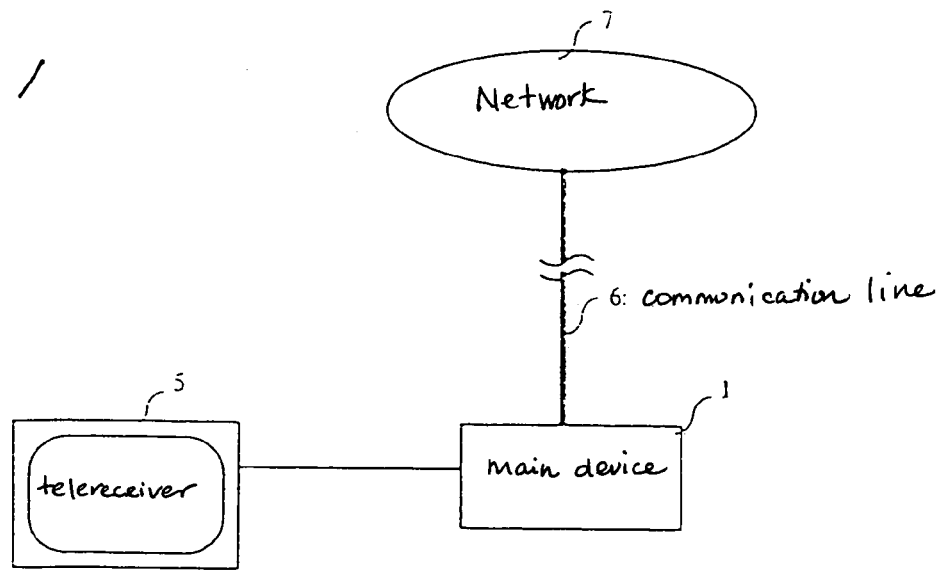
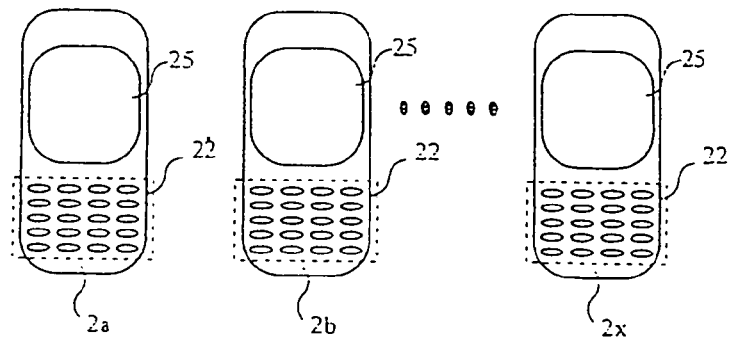

Fig. 7A

① 10:35 Thank you for your good job yesterday From Yamada
② 11:24 Tomorrow's meeting
③ 15:28 Waiting for your reply From Tanaka A: 3 New Mails

Fig. 7B

A: No New Mail

Fig 8

②11:24 Tomorrow's meeting

A: Start time of tomorrow's meeting is changed from 9:00 to 10:00.

NETWORK APPARATUS FOR ACCESSING SERVICES OVER A NETWORK

BACKGROUND OF THE INVENTION

The present invention relates to a network apparatus capable of accessing services provided from a linked network, such as the Internet.

Conventionally, an internet terminal linked to the Internet to access various kinds of services provided from a network has come into widespread use, and a great number of users use an electronic mail service (hereinafter, referred to simply as mail service) known as one of the services available through the Internet. In order to receive an incoming electronic mail in the mail service, the user has to input his password or the like as a specific code, and for this reason, a third party who does not know the password cannot receive the electronic mail without permission. This prevents an incoming electronic mail addressed to a particular user from being seen by the others.

However, the conventional internet terminal displays private information obtained from the network, such as the content of a received electronic mail, on a separate display device, such as a telereceiver. Therefore, when the user conducts a receiving manipulation and receives an electronic mail addressed to him, not only the user but also anyone around the display device can see the electronic mail. This poses a problem that private information is leaked to the others, and there has been an increasing need for improved security on the private information.

Recently, there has been proposed a technique to display the private information obtained from a network, such as the Internet, on a display unit provided on a communication device, such as a portable phone (the Unexamined Japanese Patent Application Publication Nos. Hei7-193866, Hei 8-125724, etc.). With this type of communication device, if the user moves away from the people around so that they cannot see the display on the display unit when receiving the private information from the network, no one but the user alone can see the content displayed on the display unit. In contrast, because the conventional internet terminal is arranged to display information obtained from the network on a separate display device, such as the telereceiver, it cannot handle the information in the same manner as the above portable phone.

SUMMARY OF THE INVENTION

It is therefore an object of the present invention to provide a network apparatus with improved security on private information in accessing services provided from a linked network.

In order to solve the above problems, a network apparatus of the present invention has the following arrangements.

(1) The network apparatus comprises a main device linked to a network represented by the Internet and a portable remote controller device for remotely controlling the main device by means of communication, wherein the remote controller device includes:

access destination specifying means for specifying an access destination to the main device; and display means for displaying information sent from the main device, and wherein the main device includes:

access means for accessing the access destination specified by the remote controller device and obtaining information therefrom; and information sending means for sending the information obtained by the access means to the remote controller device.

According to the above arrangement, when the remote controller device specifies the access destination to the main device, the main device accesses the specified access destination, obtains information therefrom, and sends the same to the remote controller device. The remote controller device displays the information sent from the main device on the display unit. Because the remote controller device is portable, the user can carry away the remote controller device to a place where the received information is not seen by anyone around, thereby making it possible to improve security on private information.

(2) The remote controller device further includes identification code storage means for storing an identification code identifying itself;

the access destination specifying means serves as means for sending the identification code;

the main device further includes access destination storage means for storing the identification code of the remote controller device and the access destination in a one-to-one correspondence; and the access means serves as means for accessing the access destination corresponding to the identification code of the remote controller device received.

According to the above arrangement, the remote controller device sends the identification code that identifies itself to the main device, and the main device accesses the access destination corresponding to this particular identification code. Thus, even when a plurality of remote controller devices share a single main device, by assigning a different identification code to each remote controller device and storing the access destination of each remote controller device in the main device, the main device accesses the access destination corresponding to each remote controller device. Hence, when the remote controller device corresponding to the access destination is not present, the main device cannot access the access destination.

(3) The access destination storage means serves as means for storing a mail address as the access destination.

According to the above arrangement, because the mail address is stored as the access destination, the user can receive electronic mails easily.

(4) The display means of the remote controller device includes title displaying means for displaying a title of the information sent from the main device.

According to the above arrangement, the tile of the information the main device has obtained from the specified access destination is displayed on the remote controller device. Thus, the user can easily judge the subject of the information obtained from the access destination.

(5) The display means of the remote controller device serves as means for, when the title displayed on the title display means is specified, displaying the information corresponding to the title specified.

According to the above arrangement, the user can readily confirm the content of the information corresponding to the title being displayed.

(6) The information sending means of the main device sends the information to the remote controller device at an information sending destination after appending the identification code of the remote controller device to the information; and the remote controller device further includes display disabling means for, when the information sent from the main device to the display means is not appended with its own identification code, disabling display of the information.

According to the above arrangement, the main device appends the identification code of the remote controller device at the information sending destination to the information and sends the same to the remote controller device, and the remote controller device disables the display of the information if it is not appended with its own identification code. Thus, it is ensured that the information is not displayed on the display unit of any remote controller device other than the one that has sent an access command to the main device.

(7) The main device and remote controller device communicate with each other by means of infrared rays.

The main device and remote controller device conduct an infrared communication.

BRIEF DESCRIPTION OF THE DRAWINGS

FIG. 1 is a view depicting an arrangement of a network apparatus in accordance with one embodiment of the present invention;

FIGS. 7A and 7B are views showing a display example on a display unit of the remote controller device in accordance with one embodiment of the present invention; and FIG. 8 is a view showing another display example on the display unit of the remote controller device in accordance with one embodiment of the present invention.

DETAILED DESCRIPTION OF THE PREFERRED EMBODIMENTS

Figure 2:
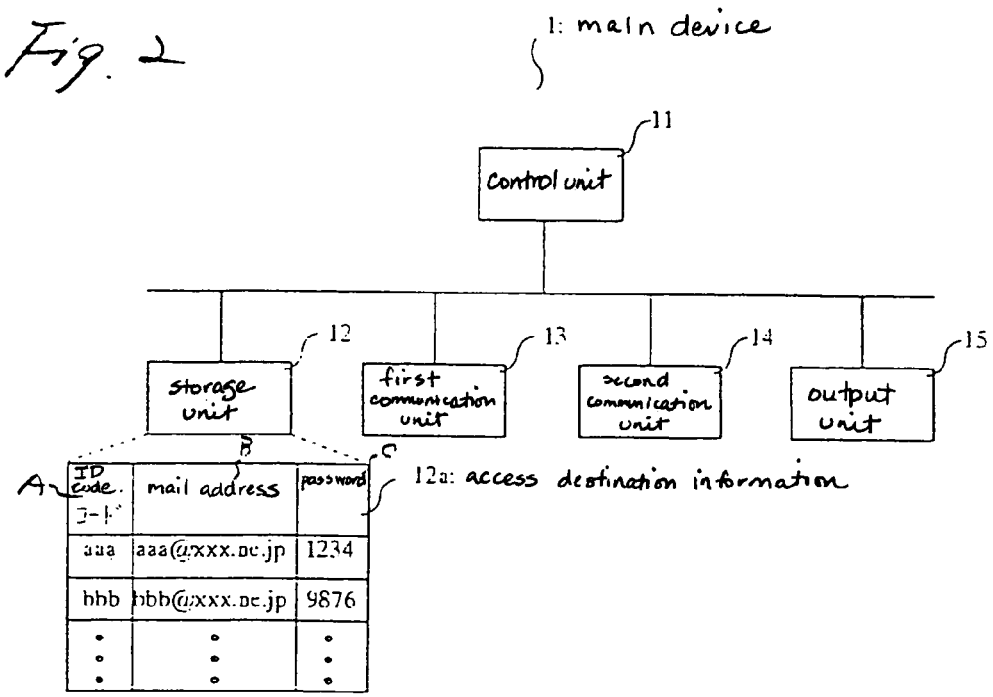
FIG. 2 is a view depicting an arrangement of a main device in accordance with one embodiment of the present invention.

FIG. 1 is a view depicting an arrangement of a network apparatus in accordance with one embodiment of the present invention. The network apparatus of the present embodiment includes a main device 1 and a plurality of remote controller devices 2 (2a, 2b, . . . , 2x). Numeral 5 denotes a telereceiver connected to the main device 1, which displays information or the like on the screen based on an input signal from the main device 1. The main device 1 is linked to a network 7, such as the Internet, through a communication line 6, so that it can access various kinds of services provided from the network 7. Each remote controller device 2 is assigned with a different ID (identification) code. For example, the remote controller devices 2a and 2b are assigned with their own ID codes, "aaa" and "bbb", respectively.

Figure 3:
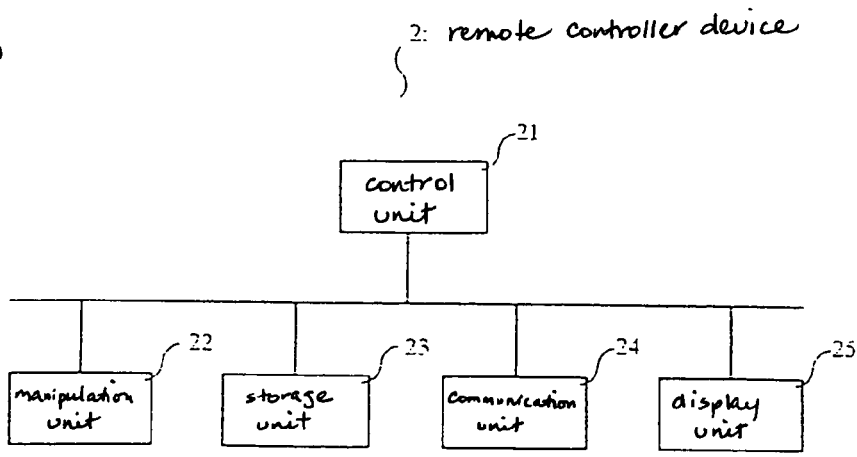
FIG. 3 is a view depicting an arrangement of a remote controller device in accordance with one embodiment of the present invention.

FIG. 2 is a block diagram depicting an arrangement of the main device 1, and FIG. 3 is a block diagram depicting an arrangement of each remote controller device 2. The main device 1 includes a control unit 11 for controlling operations of the main body, a storage unit 12 for storing access destination information 12a that registers mail addresses of the remote controller devices 2 in a one-to-one correspondence, a first communication unit 13 for communicating with the remote controller devices 2 by means of infrared rays, a second communication unit 14 for communicating with the network 7 through the communication line 6, and an output unit 15 for outputting a signal to the telereceiver 5. The access destination information 12a is the information that registers the ID codes, mail addresses, and passwords and their respective remote controller devices 2 in a one-to-one correspondence. The storage unit 12 is also provided with a storage area where information obtained from the network 7, information sent from the remote controller devices 2, or the like is stored. In addition, the control unit 11 determines the setting of each remote controller device 2 as to whether an output from the output unit 15 to the telereceiver 5 is disabled or enabled. When the output from the output unit 15 to the telereceiver 5 is disabled, none of the information the main device 1 has obtained from the network 7 is displayed on the telereceiver 5.

Each remote controller device 2 includes a control unit 21 for controlling operations of the main body, a manipulation unit 22 provided with keys used for input manipulations, a storage unit 23 for storing the ID code assigned to the self, a communication unit 24 for communicating with the main device 1 by means of infrared rays, and a display unit 25 for displaying information or the like received from the main device 1. As previously mentioned, each remote controller device 2 is assigned with a different ID code from those assigned to the others.

Figure 4:
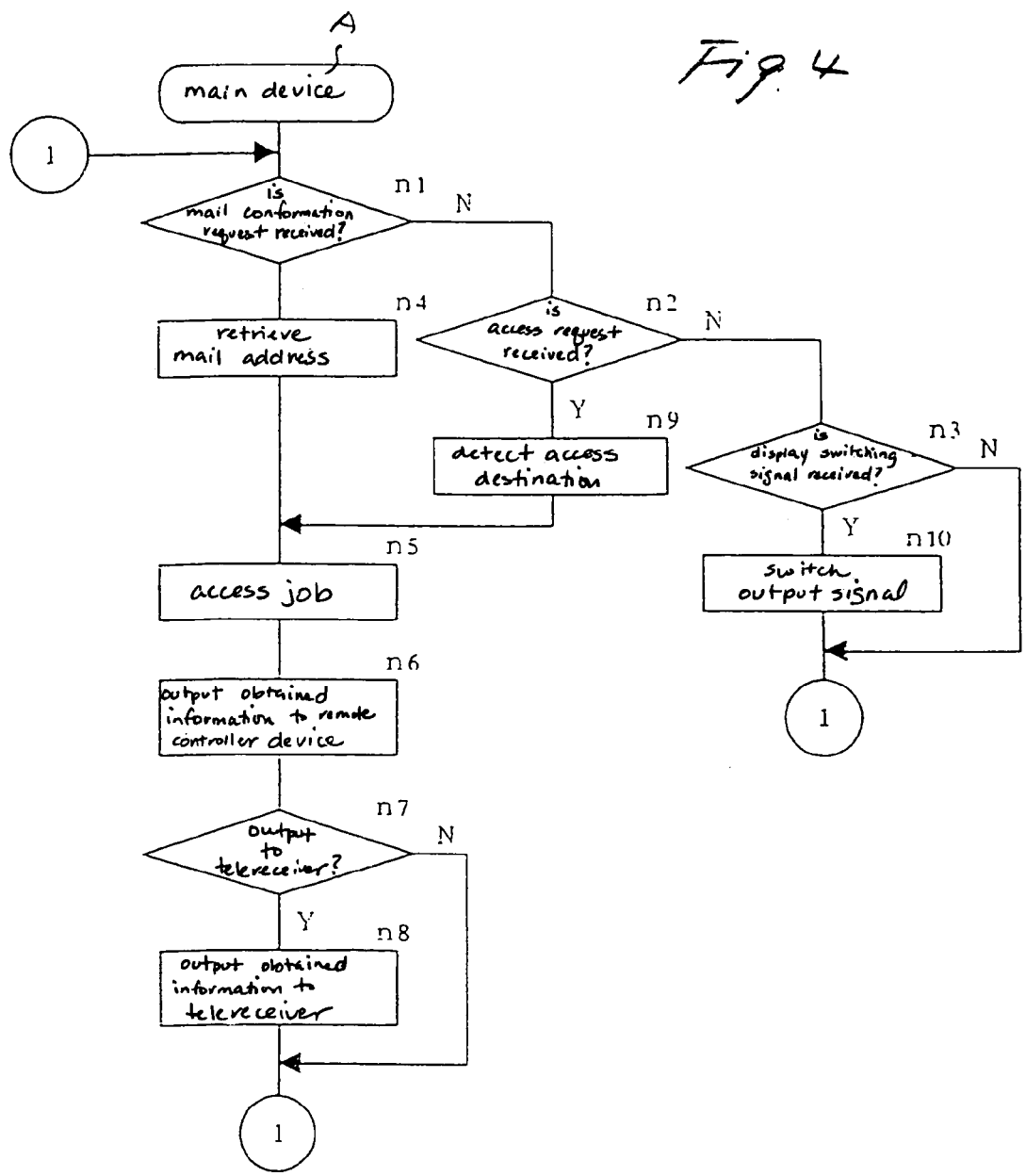
FIG. 4 is a flowchart detailing operations of the main device in accordance with one embodiment of the present invention.
Figure 5:
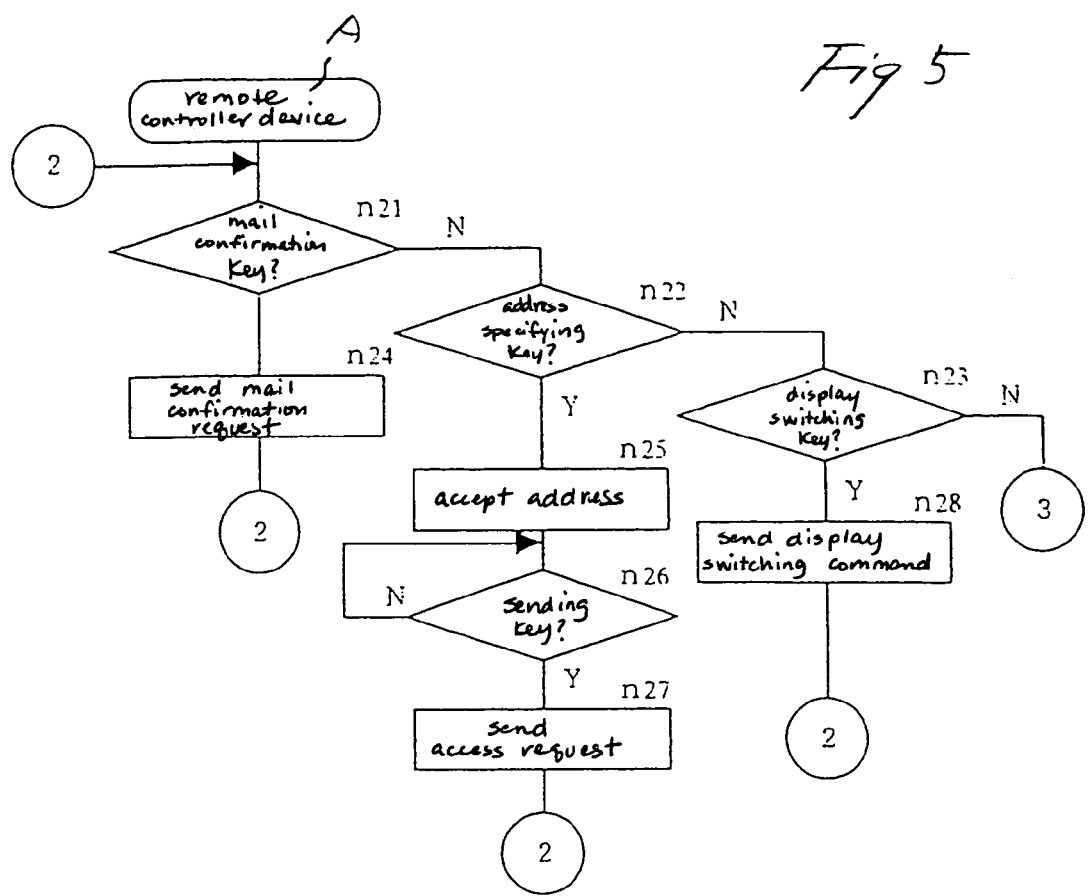
FIG. 5 is a flowchart detailing operations of the remote controller device in accordance with one embodiment of the present invention.
Figure 6:
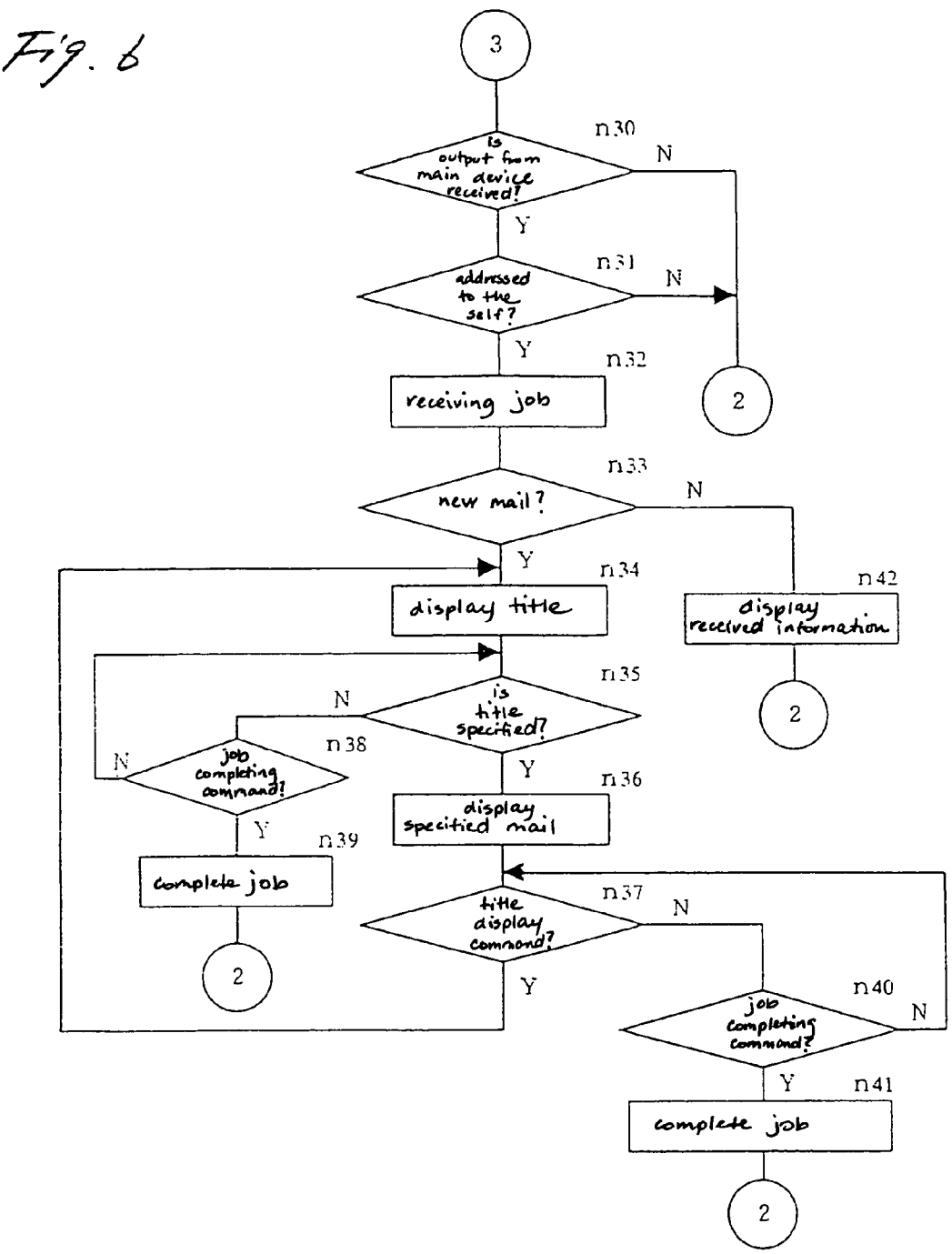
FIG. 6 is another flowchart detailing operations of the remote controller device in accordance with one embodiment of the present invention.

The following description will describe operations of the network apparatus of the present embodiment. FIG. 4 is a flowchart detailing the operations of the main device 1, and FIGS. 5 and 6 are flowcharts detailing the operations of the remote controller device 2. The remote controller device 2 is provided with a mail confirmation key (not shown) in the manipulation unit 22, and when the mail confirmation key is manipulated (n21), the remote controller device 2 sends a mail confirmation request appended with its own ID code stored in the storage unit 23 from the communication unit 24 to the main device 1 (n24), and returns to n21. Here, n24 corresponds to access destination specifying means referred to in the present invention.

Upon receipt of the mail confirmation request sent from any remote controller device 2 at the first communication unit 13 (n1), the main device 1 retrieves the mail address corresponding to the remote controller device 2 that has sent the mail confirmation request (n4). More specifically, the main device 1 retrieves the access destination information 12a by using the ID code appended to the mail confirmation request sent from the remote controller device 2 as a key, and reads out the mail address and password of the remote controller device 2 that has sent the mail confirmation request. Upon completion of the job in n4, the main device 1 accesses a corresponding mailbox (mail address read out in n4) over the network 7 through the communication line 6, and obtains all the received mails (new mails) if any (n5). Here, n5 corresponds to access means referred to in the present invention. As is well known, the password is necessary to access the mailbox to obtain new mail(s), and it should be noted that the main device 1 has already read out the password in n4.

The main device 1 outputs the new mail(s) obtained from the network 7 from the first communication unit 13 to the remote controller device 2 (n6). Here, n6 corresponds to information sending means referred to in the present invention. More specifically, the main device 1 appends the ID code of the remote controller device 2 that has sent the mail confirmation request received in n1 to the new mail(s) to be outputted. When there is no new mail in the mailbox, the main device 1 outputs a message indicating so after appending the ID code of the request sender remote controller device 2 to the message. Further, the main device 1 judges whether an output from the output unit 15 to the telereceiver 5 is disabled or not (n7) If so, the main device 1 returns to n1; otherwise, the main device 1 outputs the new mail(s) obtained in n5 from the output unit 15 to the telereceiver 5 (n8), and returns to n1. Accordingly, the information the main device 1 has obtained from the network 7 is not displayed on the telereceiver 5 when the output from the output unit 15 to the telereceiver 5 is disabled, and conversely, the information the main device 1 has obtained from the network 7 is displayed on the telereceiver 5 when the output from the output unit 15 to the telereceiver 5 is enabled. Thus, if the information is of the kind that the user does not wish to be seen by the others around the telereceiver 5, the information will not be displayed on the telereceiver 5 by disabling the output from the output unit 15 to the telereceiver 5, and instead, as will be discussed below, the information will be displayed on the display unit 25 of the remote controller device 2 alone, thereby preventing the information from being seen by the others. The switching between disabling and enabling of the output from the output unit 15 to the telereceiver 5 will be described below.

Upon receipt of the information outputted from the main device 1 at the communication unit 24 (n21→n22→n23→n30), the remote controller device 2 judges whether the information is outputted to the self or not (n31). More specifically, the remote controller device 2 judges whether the information is addressed to the self or not by checking whether the ID code appended to the received information coincides with its own ID code. When the remote controller device 2 judges that the information outputted from the main device 1 is not addressed to the self, it neglects the information and returns to n21. When the remote controller device 2 judges otherwise, it executes a receiving job at the communication unit 24 (n32). Upon completion of the receiving job, the remote controller device 2 checks whether the information sent from the main device 1 is one or more new mails (n33), and if so, the remote controller device 2 displays the title of each received new mail (n34). For example, FIG. 7(A) shows a display on the display unit 25 of the remote controller device 2 when three new mails are received from the main device 1, and FIG. 7(B) shows a display on the display unit 25 of the remote controller device 2 when no new mail is received. The remote controller device 2 stores the contents (texts) of the new mail(s) sent from the main device 1 in the storage unit 23.

When the user manipulates the manipulation unit 22 to specify a title he would like to see out of the titles displayed on the display unit 25 (n35), the remote controller device 2 reads out the text of the new mail corresponding to the title specified in n35 from the storage unit 23 and displays the same on the display unit 25 (n36) (see FIG. 8). Subsequently, when the user manipulates the manipulation unit 22 to display the titles (n37), the remote controller device 2 returns to n34, and repeats the foregoing jobs. Thus, by repeating the foregoing procedure, the user can confirm the content of each of the new mails sent from the main device 1 on the display unit 25 of the remote controller device 2. When the user manipulates the manipulation unit 22 to complete the job (n38, n40), the remote controller device 2 executes a completing job in n39 or n41, and returns to n21.

As has been discussed, with the network apparatus of the present embodiment, the user can confirm mails on the display unit 25 of the remote controller device 2. Also, by disabling the output from the output unit 15 to the telereceiver 5, no information will be displayed on the telereceiver 5. Alternatively, the main device 1 may store the content of each new mail in the storage unit 12, so that, when the title is specified on the remote controller device 2, the text corresponding to the specified title will be displayed on the display unit 25 of the remote controller device 2 by means of infrared communication between the main device 1 and remote controller device 2. In addition, because the title of each received new mail is displayed, the user can readily judge the subjects of the received new mails. Moreover, the user can confirm the contents thereof by an easy manipulation of specifying the title.

Also, instead of the mail address, the remote controller device 2 can specify any address over the network 7, such as a home page, as the access destination to the main device 1. In this case, the user manipulates not the mail confirmation key but an address specifying key (not shown) in the manipulation unit 22, and then inputs the address of the access destination. Once the address specifying key is manipulated (n21→n22), the remote controller device 2 accepts the address inputted by the user (n25). When a sending key (not shown) provided in the manipulation unit 22 is manipulated (n26), the remote controller device 2 sends an access request to the main device 1 after appending its own ID code to the address accepted in n25 (n27), and returns to n21. Here, n27 also corresponds to access destination specifying means referred to in the present invention.

Upon receipt of the access request from any remote controller device 2 (n1→n2), the main device 1 detects the address (address inputted by the user) over the network 7 specified by the access request as the access destination (n9). Subsequently, the main device 1 proceeds to n5 where it executes an access job to obtain information from the access destination. Then, the main device 1 appends the ID code of the remote controller device 2 that has sent an access request signal to the information obtained in n5 and outputs the same from the first communication unit 13 (n6), after which the main device 1 executes the jobs in n7 and n8 and returns to n1.

Upon receipt of the output from the main device 1, the remote controller device 2 executes jobs in n30 and onward. In this case, because the information sent from the main device 1 is not a new mail, the remote controller device 2 proceeds to n42 from n33, and returns to n21 after it has displayed the information received from the main device 1 on the display unit 25.

Consequently, the user can specify any desired access destination over the network 7 to the main device 1 by manipulating the remote controller device 2. The user can also confirm the information the main device 1 has obtained from the network 7 either on the display unit 25 of the remote controller device 2 or telereceiver 5.

Next, the following description will describe a switching manipulation between disabling and enabling of the output from the output unit 15 to the telereceiver 5. When the user manipulates a display switching key (not shown) provided in the manipulation unit 22, the remote controller device 2 outputs a display switching signal to the main device 1 (n21→n22→n23→n28). The remote controller device 2 also appends its own ID code to the display switching signal, and sends the same to the main device 1.

Upon receipt of the display switching signal from the remote controller device 2 (n1→n2→n3), the main device 1 switches the output from the output unit 15 to the telereceiver 5 from "disable" to "enable" and vice versa (n10). Thus, with the network apparatus of the present embodiment, the information obtained from the network 7 can be displayed on the telereceiver 5 as well, and therefore, if the information is open to public (for example, a home page), the user can confirm the content of the information on the larger screen of the telereceiver 5.

As has been explained, the main device 1 stores the setting of the remote controller devices 2 as to whether the output from the output unit 15 to the telereceiver 5 is disabled or enabled in the storage device 12 in a one-to-one correspondence. For this reason, even when the output from the output unit 15 to the telereceiver 5 is enabled for some of the remote controller devices 2, it is ensured that no information is outputted from the output unit 15 to the telereceiver 5 for the remote controller devices 2 to which the output is disabled.

As has been explained, the network apparatus of the present embodiment is arranged such that the information obtained form the network 7, such as new mails, is displayed on the display unit 25 of the remote controller device 2 that remotely controls the main device 1, and that the setting as to whether the display on the telereceiver 5 is disabled or enabled can be switched. Consequently, the security on the private information can be improved. The network apparatus is also arranged such that a different ID code is assigned to each remote controller device 2, and the main device 1 determines the mail address to be accessed based on the ID code sent from the remote controller device 2. Hence, any other remote controller device 2 cannot access the mail address thus determined. Accordingly, even when the remote controller devices 2 are distributed to the users at random, this arrangement can eliminate a problem that anyone having the remote controller device 2 receives an electronic mail addressed to a particular user without permission. Also, the network apparatus is arranged such that the main device 1 appends the ID code of the remote controller device 2 at the information sending destination to the information obtained from the network 7 and sends the same to that particular remote controller device 2, and the remote controller device 2 neglects information if the information is not appended with its own ID code. This arrangement can eliminate a problem that the information outputted from the main device 1 is displayed on the display unit 25 of the remote controller device 2 that has not sent the request to the main device 1 to access the network 7.

As has been discussed, according to the present invention, the information the main device has obtained from the specified access destination is displayed on the display unit of the remote controller device that remotely controls the main device. Hence, the user can move to a place where the information obtained from the network is not seen by anyone around, thereby making it possible to improve the security on the private information.

In addition, a different ID code is assigned to each remote controller device and the main device stores the access destination of each remote controller device in a one-to-one correspondence. Therefore, even when a plurality of remote controller devices share a single main device, the main device accesses the access destination corresponding to each remote controller device. Hence, if the remote controller device corresponding to the access destination is not present, the main device cannot access the access destination. This arrangement prevents the privation information from being seen by the others without permission.

In addition, because the main device stores the mail address of each remote controller device as the access destination, the user can receive an electronic mail without inputting the mail address.

Also, because the title of the information the main device has obtained from the access destination is displayed, the user can readily judge the subject of the information obtained from the access destination.

Further, the main device appends the ID code of the remote controller device at the information sending destination to the information and sends the same to the remote controller device, and the remote controller device disables the display of the information if it is not appended with its own ID code. Consequently, the information is not displayed on the display unit of any remote controller device other than the one that has issued an access command to the main device.

What is claimed is:

1. A network apparatus comprising:
   a main device operable to be linked to a network; and
   a portable remote controller device operable to remotely control the main device by way of communication,
   wherein the remote controller device includes:
      a first display operable to display information sent from the main device;
      an identification code storage storing an identification code of the remote controller; and
      an identification code sending section operable to send the identification code to the main device;
   wherein the main device includes:
      an access destination storage storing the identification code of the remote controller and an access destination in the network in a one-to-one correspondence;
      an access section operable to access the access destination corresponding to the identification code sent from the remote controller device and obtain the information from the access destination; and
      an information sending section operable to send the obtained information to the remote controller device;
   wherein the main device is configured to be connected to a second display operable to display the obtained information;
   wherein the remote controller device is operable to send a display switching signal to the main device; and
   wherein the main device determines whether the second display displays the obtained information based on the display switching signal sent from the remote controller device.

2. The network apparatus according to claim 1, wherein the first display of the remote controller device includes a title displaying section operable to display a title of the information sent from the main device.

3. The network apparatus according to claim 2, wherein when the displayed title is specified, the first display of the remote controller device displays a content of the information corresponding to the specified title.

4. The network apparatus according to claim 1, wherein:
   the information sending section of the main device appends an identification code to the information and sends the information together with the appended identification code to the remote controller device; and
   the remote controller device further includes a display disabling section that disables the first display to display the sent information when the appended identification code is not in conformity with the stored identification code.

5. The network apparatus according to claim 4, wherein the main device and said remote controller device communicate with each other using infrared rays.

6. The network apparatus according to claim 1, wherein the main device and the remote controller device communicate with each other using infrared rays.

7. The network apparatus according to claim 1, wherein the access destination storage stores a mail address as the access destination.

8. The network apparatus according to claim 7, wherein the first display of the remote controller device includes a title displaying section operable to display a title of the information sent from the main device.

9. The network apparatus according to claim 8, wherein when the displayed title is specified, the first display of the remote controller device displays a content of the information corresponding to the specified title.

10. A network apparatus, comprising:
a main device operable to be linked to a network; and
a portable remote controller device operable to remotely control the main device by way of communication,
wherein the remote controller device includes:
an access destination specifying section operable to specify an access destination in the network and send the specified access destination to the main device;
a first display operable to display information sent from the main device; and
an identification code storage storing an identification code of the remote controller;
wherein the main device includes:
an access section operable to access the specified access destination and obtain the information from the access destination
an information sending section operable to send the obtained information to the remote controller device; and
wherein the main device is configured to be connected to a second display operable to display the obtained information;
wherein the information sending section of the main device appends an identification code to the information and sends the information together with the appended identification code to the remote controller device; and
wherein the remote controller device further includes a display disabling section that disables the first display to display the sent information when the appended identification code is not in conformity with the stored identification code.

11. The network apparatus according to claim 10, wherein the first display of the remote controller device includes a title displaying section operable to display a title of the information sent from the main device.

12. The network apparatus according to claim 11, wherein when the displayed title is specified, the first display of the remote controller device displays a content of the information corresponding to the specified title.

13. The network apparatus according to claim 12, wherein the main device and the remote controller device communicate with each other using infrared rays.

14. The network apparatus according to claim 11, wherein the main device and the remote controller device communicate with each other using infrared rays.

15. The network apparatus according to claim 10, wherein the main device and the remote controller device communicate with each other using infrared rays.

16. The network apparatus of claim 10, wherein the main device includes a storage that stores the identification code, electronic mail address and password of the remote controller device in a one-to-one correspondence.

17. A method for accessing information over a network, comprising:
sending a request for information from a portable remote controller device having a first display to a main device configured to be connected to a second display;
obtaining the requested information from the network;
providing the obtained information from the main device to the remote controller device;
displaying the sent information on the first display of the remote controller device;
sending a display switching signal from the remote controller device to the main device; and
determining whether the second display of the main device displays the obtained information based on the display switching signal sent from the remote controller device.

18. The method of claim 17, further comprising:
sending another display switching signal from another remote controller device to the main device; and
determining whether the second display of the main device displays information requested from the another remote controller device based on the another display switching signal sent from the another remote controller device.

19. A method for accessing information over a network, comprising:
sending a request for information from a portable remote controller device having a first display to a main device;
obtaining the requested information from the network;
providing the obtained information from the main device to the remote controller device;
displaying the sent information on the first display of the remote controller device;
sending a display switching signal from the remote controller device to the main device; and
determining whether a second display coupled to the main device displays the obtained information based on the display switching signal sent from the remote controller device,
sending another display switching signal from another remote controller device to the main device;
determining whether the second display of the main device displays information requested from the another remote controller device based on the another display switching signal sent from the another remote controller device;
storing in the main device, an identification code, electronic mail address and password of each of the remote controller device and the another remote controller device in a one-to-one correspondence.

* * * * *

UNITED STATES PATENT AND TRADEMARK OFFICE
CERTIFICATE OF CORRECTION

PATENT NO. : 7,631,192 B1  
APPLICATION NO. : 09/699402  
DATED : December 8, 2009  
INVENTOR(S) : Masahiro Matsuo Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2831 days.

Signed and Sealed this

Twenty-first Day of December, 2010

David J. Kappos  
*Director of the United States Patent and Trademark Office*